(12) United States Patent
Chien

(10) Patent No.: US 8,386,365 B2
(45) Date of Patent: Feb. 26, 2013

(54) INTERACTIVE ONLINE FUNDING METHOD AND SYSTEM THEREOF

(75) Inventor: Yung-Sung Chien, Taipei (TW)

(73) Assignee: Shacom.Com Inc., Taipei (TW)

( * ) Notice: Subject to any disclaimer, the term of this patent is extended or adjusted under 35 U.S.C. 154(b) by 1273 days.

(21) Appl. No.: 11/947,744

(22) Filed: Nov. 29, 2007

(65) Prior Publication Data

US 2008/0228624 A1 Sep. 18, 2008

(30) Foreign Application Priority Data

Mar. 16, 2007 (TW) ................................ 96109015 A
May 7, 2007 (TW) ................................ 96116081 A

(51) Int. Cl.
*G06Q 40/00* (2012.01)
(52) U.S. Cl. ............................................ 705/37; 705/35
(58) Field of Classification Search .................... 705/35
See application file for complete search history.

(56) References Cited

U.S. PATENT DOCUMENTS

| | | | | | |
|---|---|---|---|---|---|
| 5,611,052 | A | * | 3/1997 | Dykstra et al. .................. | 705/38 |
| 5,940,812 | A | * | 8/1999 | Tengel et al. .................. | 705/38 |
| 5,966,699 | A | * | 10/1999 | Zandi .............................. | 705/38 |
| 5,995,947 | A | * | 11/1999 | Fraser et al. ..................... | 705/38 |
| 6,233,566 | B1 | * | 5/2001 | Levine et al. ............... | 705/36 R |
| 6,629,082 | B1 | * | 9/2003 | Hambrecht et al. ........ | 705/36 R |
| 7,146,337 | B1 | * | 12/2006 | Ward et al. ...................... | 705/38 |
| 7,925,579 | B1 | * | 4/2011 | Flaxman et al. ................ | 705/38 |
| 2001/0029482 | A1 | * | 10/2001 | Tealdi et al. ..................... | 705/38 |
| 2002/0029188 | A1 | * | 3/2002 | Schmid ............................ | 705/38 |
| 2002/0082985 | A1 | * | 6/2002 | MacKay .......................... | 705/39 |
| 2002/0095369 | A1 | * | 7/2002 | Kaplan et al. ................... | 705/37 |
| 2002/0120557 | A1 | * | 8/2002 | Chien ............................. | 705/38 |
| 2005/0273423 | A1 | * | 12/2005 | Kiai et al. ........................ | 705/38 |
| 2006/0155638 | A1 | * | 7/2006 | de la Motte ..................... | 705/37 |

OTHER PUBLICATIONS

Toonkel, Jessica, "Web Start-Up to Host Loan, CD Auctions," American Banker; Aug. 17, 2000, vol. 165, issue 158, p. 1.*
Microsoft computer Dictionary, 5th Edition, 2002.*

* cited by examiner

*Primary Examiner* — Hani M Kazimi
*Assistant Examiner* — Joan Goodbody
(74) *Attorney, Agent, or Firm* — Winston Hsu; Scott Margo

(57) ABSTRACT

An interactive online funding method includes providing an interactive online funding platform, offering an interactive funding activity for a user to participate in the interactive online funding platform, by placing a bid, and comparing the bid price of the user with a threshold price set by the interactive online funding platform. When the bid price is greater than or equal to the threshold price, the method further includes utilizing the interactive online funding platform to perform settlement and liquidation to remit a loan amount to the user according to at least the bid price; when the bid price is lower than the threshold price, the method further includes utilizing the interactive online funding platform to perform settlement and liquidation to receive a deposit amount from the user according to the bid price.

24 Claims, 7 Drawing Sheets

INTERACTIVE ONLINE FUNDING METHOD AND SYSTEM THEREOF

BACKGROUND OF THE INVENTION

1. Field of the Invention

The present invention relates to funding, and more particularly, to an interactive online funding method and system thereof.

2. Description of the Prior Art

A traditional approach to savings and loan funding is that a person saves money into a bank, the bank pays interest to the person, and then the bank lends the money to other borrowers. Furthermore, the bank receives a higher loan interest from the borrowers and earns the spread (i.e., the difference between the loaned interest earned and the deposited interest paid out). This aforementioned conventional approach is known as indirect financing.

On the other hand, in general, a rotating savings and credit association ("friendly society") is another approach to savings and loan funding. The rotating savings and credit association responds to civil needs of microcredit, and is known as direct financing, which means the rotating savings and credit association does not mediate between lenders and borrowers. However, the lenders receive better interest rate from the rotating savings and credit association by undertaking higher risk.

In conclusion, there is a need to create a direct financing mechanism between lenders and borrowers to eliminate the intermediary spread between the lenders and borrowers, and to reduce the risk of default.

SUMMARY OF THE INVENTION

It is therefore one of the objectives of the claimed invention to provide an interactive online funding method and system thereof, to solve the above-mentioned problems.

According to an exemplary embodiment of the present invention, an interactive online funding method is disclosed. The method comprises: providing an interactive online funding platform (IOFP); offering an interactive funding activity for a user to place a bid price; comparing the bid price of the user with a threshold price set by the IOFP; when the bid price is greater than or equal to the threshold price, the user wins the bid, and the IOFP will perform settlement and liquidation to remit a loan amount to the user according to at least the bid price; and when the bid price is lower than the threshold price, the IOFP will perform settlement and liquidation to receive a deposit amount from the user according to the bid price.

According to an exemplary embodiment of the present invention, an Interactive Online Funding System (IOFS) is further disclosed. The IOFS comprises a processor and a storage device, coupled to the processor for storing a program code. When the processor executes the program code, the program code provides an interactive online funding platform (IOFP) for a user to participate in an interactive funding activity to place a bid price. The comparison subprogram executed by the processor compares the bid price of the user with a threshold price. When the bid price is greater than or equal to the threshold price, the settlement and liquidation subprogram will be executed by the processor to remit a loan amount to the user according to at least the bid price. When the bid price is lower than the threshold price, the settlement and liquidation subprogram will be executed by the processor to receive a deposit amount from the user according to the bid price.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
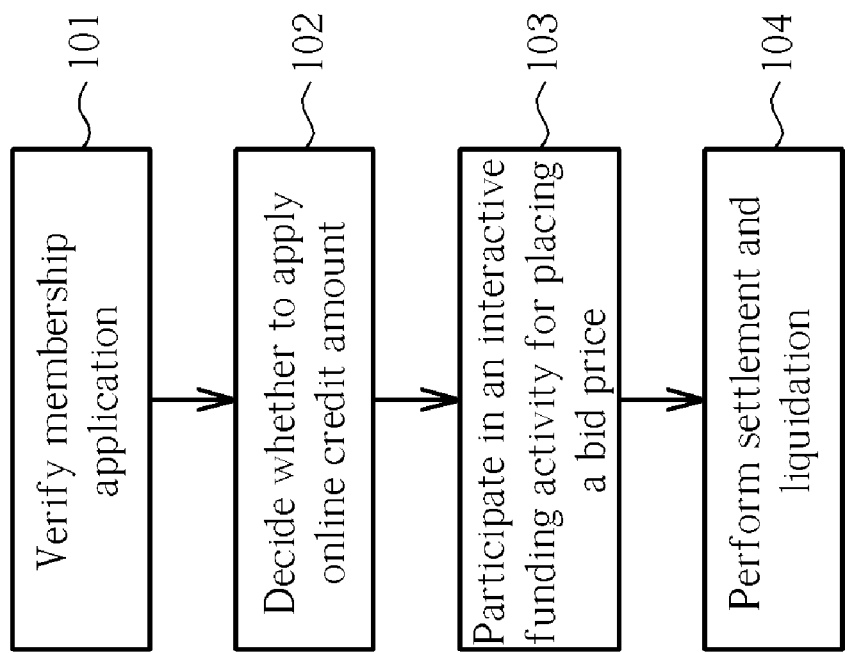
FIG. 1 is a flowchart illustrating an interactive online funding method according to an embodiment of the present invention.

Please refer to FIG. 1. FIG. 1 is a flowchart illustrating an interactive online funding method according to an embodiment of the present invention. As shown in FIG. 1, in Step 101, a user first logs into an interactive online funding platform (IOFP), wherein a process executes a first program stored in a storage device 709 to provide the IOFP. It should be noted that the storage device 709 (shown in FIG. 7) may be implemented using a non-volatile memory (e.g., a flash memory), a hard disk (HD) or an embedded storage device. Then, in Step 102, after the user inputs all basic information completely and is verified to be a valid member, the member decides whether to apply for an online credit amount. Next in Step 103, after the member submits the online credit amount application, the member participates in an interactive funding activity by placing a user's bid price in the IOFP. Proceeding with Step 104, a comparison subprogram 711 (shown in FIG. 7) of the IOFP compares the bid price of the user with a threshold price set by the IOFP (i.e., set by an administrator of the IOFP). If the user's bid price is greater than or equal to the threshold price, the IOFP performs settlement and liquidation to remit a loan amount to the user; the loan amount is determined according to at least the bid price. If the bid price is lower than the threshold price, the IOFP performs settlement and liquidation to receive from the user a deposit amount that is determined according to the bid price placed by the user. Further description of the IOFP is given below.

Figure 2:
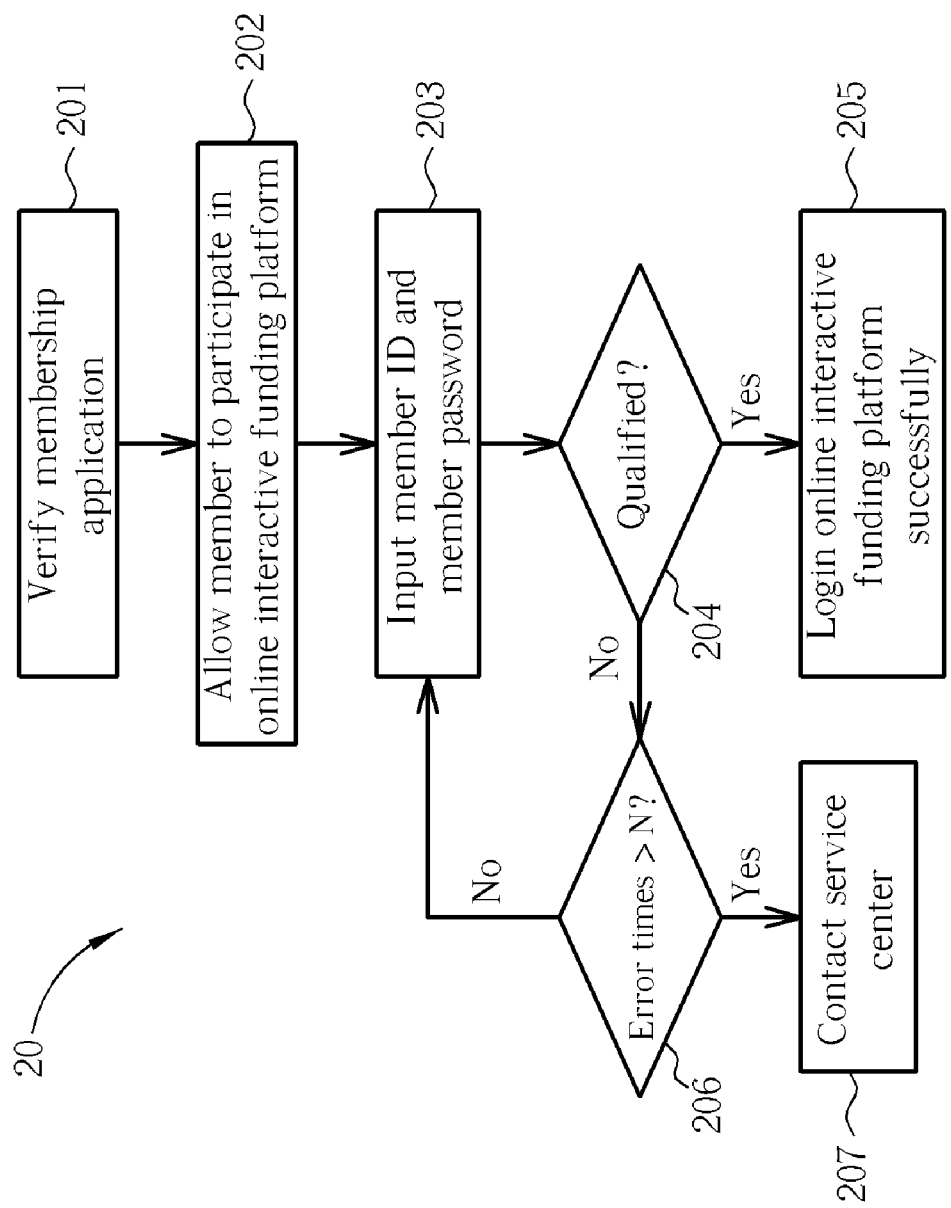
FIG. 2 is a flowchart illustrating a member login process according to one exemplary embodiment of the present invention.

Please refer to FIG. 2. FIG. 2 is a flowchart illustrating a member login process according to one exemplary embodiment of the present invention. Referring to the process 20 shown in FIG. 2, in Step 201, the user submits a membership application to the IOFP, and then the membership application is verified by the IOFP. If the membership application fails to pass the verification, the user is blocked from participating in the interactive online funding activity. If the membership application passes the verification, the user may become the member of the IOFP, meaning that the user is qualified to participate in the interactive online funding activity. Next, in Step 202, after the user completes the membership application and the membership application verification is successful, the member obtains a member ID and a member password to participate in the IOFP. Proceeding with Step 203, the member enters into the IOFP and inputs the member ID and the member password via the Internet or a remote connection. In Step 204, the IOFP examines the member ID and the member password. If the verification result is false, the process 20 goes to Step 203 to prompt the user to input the member ID and the member password again. If the member inputs an incorrect member ID or member password continuously for many times (e.g., 3 times or 5 times), the process 20 performs Step 206. In Step 206, the number of login tries is compared to a specific variable N. If the number of unsuccessful logins exceeds N, then the process proceeds to Step 207; if not, the process returns to Step 203. In Step 207, the IOFP notifies the member to contact a service center for help. On the other hand, if the verification of Step 204 is successful, the process 20 proceeds with Step 205, where the member completes the login process of the IOFP successfully.

Figure 3:
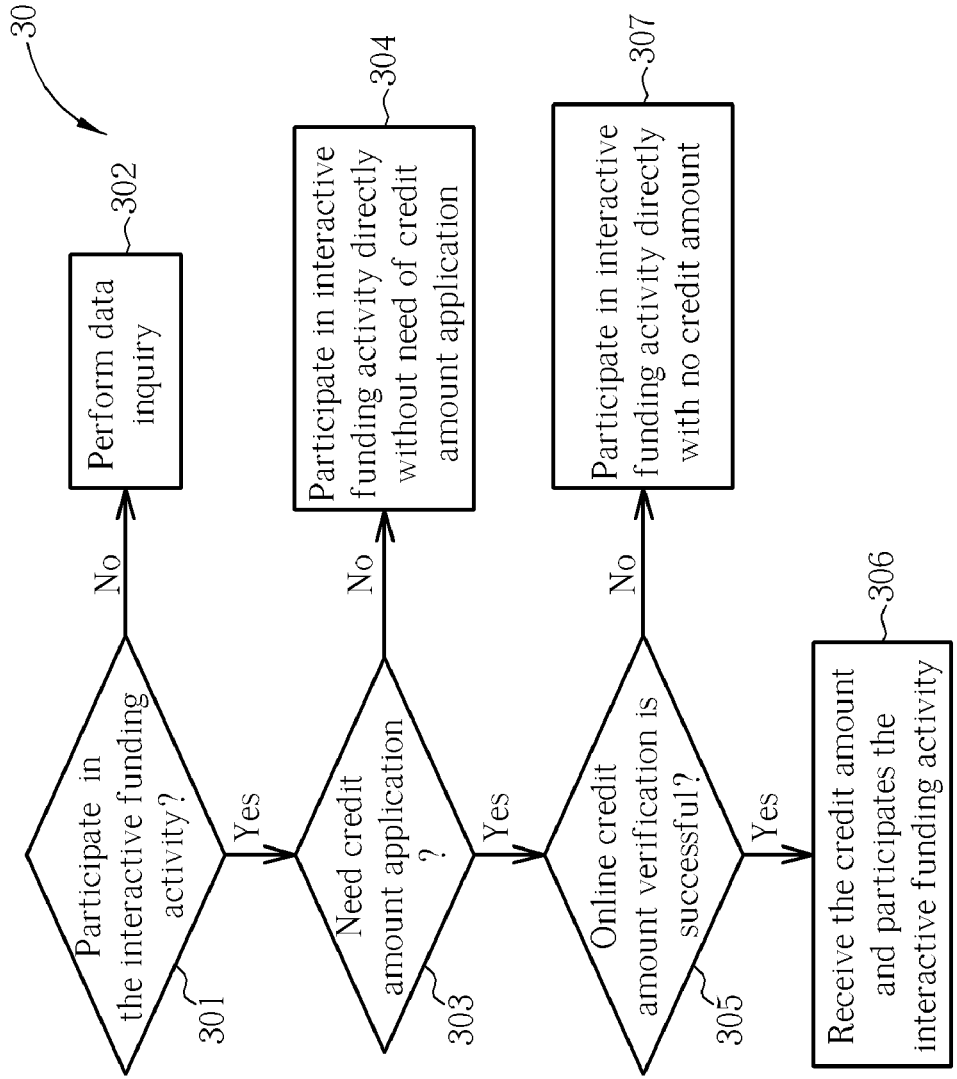
FIG. 3 is a flowchart illustrating a credit amount application for a member according to one exemplary embodiment of the present invention.

Please refer to FIG. 3. FIG. 3 is a flowchart illustrating a credit amount application for a member according to one exemplary embodiment of the present invention. Referring to the process 30 shown in FIG. 3, in Step 301, after the member completes the aforementioned process 20 shown in FIG. 2 to log into the IOFP, the first checking subprogram 717 (shown in FIG. 7) of the IOFP is executed to check if the member (user) decides to participate in the interactive funding activity, thereby generating a first checking result. In Step 302, if the first checking result indicates that the member (user) decides not to participate in the interactive funding activity, a data inquiry operation is performed through the IOFP. On the other hand, if the first checking result indicates that the member (user) decides to participate in the interactive funding activity, the process 30 proceeds with Step 303 for determining the credit amount of the member (user). In Step 303, the second checking subprogram 720 (shown in FIG. 7) of the IOFP is executed to check if the member (user) submits an online credit amount application, thereby generating a second checking result. If the second checking result indicates that the member (user) does not submit an online credit amount application, the process 30 proceeds with Step 304. In Step 304, as the member (user) does not submit the online credit amount application, the member (user) participates in the interactive funding activity directly without need of setting the credit amount via IOFP. If the second checking result indicates that the member (user) submits the online credit amount application, however, the process 30 proceeds with Step 305. A first verification subprogram 721 (shown in FIG. 7) of the IOFP is then executed to verify the online credit amount application to generate a verification result, and to determine the credit amount of the user according to the verification result. After the credit amount is granted to the user (member) submitting the online credit amount application, the member (user) with the credit amount assigned thereto participates in the interactive funding activity. When the verification result is false, it means that the submitted credit amount application fails to pass the verification, then (in Step 307), no credit amount is granted to the user (member) submitting the online credit amount application. In other words, the member (user) participates in the interactive funding activity directly with no credit amount assigned thereto via the IOFP.

Figure 4:
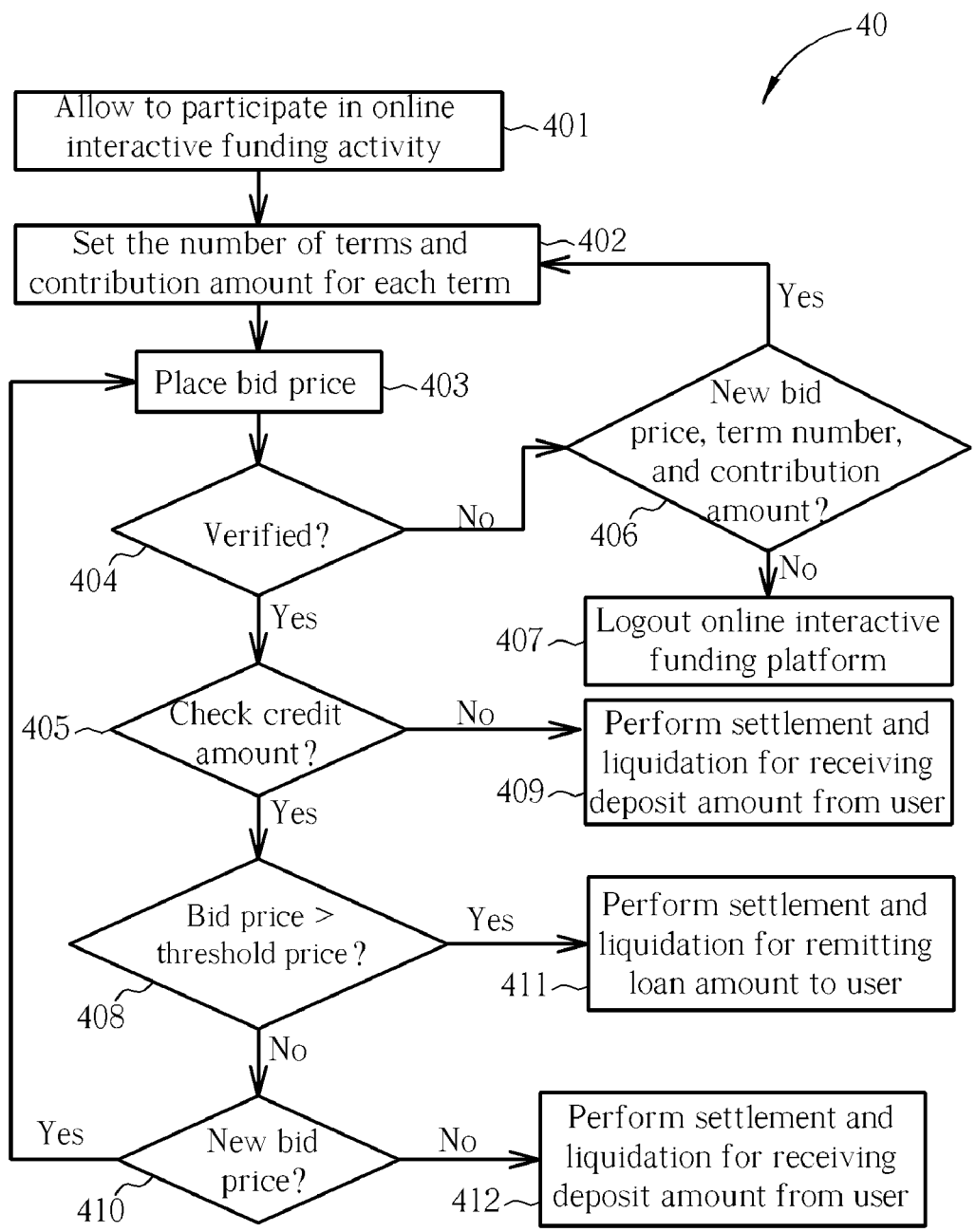
FIG. 4 is a flowchart illustrating an interactive funding activity according to one exemplary embodiment of the present invention.

Please refer to FIG. 4. FIG. 4 is a flowchart illustrating an interactive funding activity according to one exemplary embodiment of the present invention. Referring to the process 40 shown in FIG. 4, in Step 401, the member (user) is allowed to participate in the interactive online funding activity. Next, in Step 402, the member (user) sets a term number and a contribution amount for each term. Proceeding with Step 403, the member (user) places a bid price. It should be noted that the loan amount is determined according to the number of terms (e.g., 12 months, 24 months, or 36 months), the user's bid price, and the contribution amount; the deposit amount is determined according to the contribution amount and the user's bid price. Further detailed description will be presented later. Next, in Step 404, a second verification subprogram 723 (shown in FIG. 7) of the IOFP is executed to verify the number of terms, the contribution amount, and the bid price, and to check the validity thereof, wherein the first program of the IOFP includes a defining subprogram 712 (shown in FIG. 7) defining an upper bound and a lower bound of the bid price allowed to be placed by the user, and a notification subprogram 713 (shown in FIG. 7) notifying the user of the lower bound, above which a threshold price is set, serving as an interest return for the user directly saving a deposit amount to the IOFP without participating in the bidding, and serving as a benchmark for determining bid winners. If the verification of the Step 404 is true, then in Step 405, a credit checking subprogram 714 (shown in FIG. 7) of the IOFP checks the credit amount of the member (user). Please note that the credit amount defines a maximum loan amount granted to the member (user). When the checking of the Step 405 is false, it means that the credit amount is smaller than the amount that the user would receive by winning the bid, and the process 40 proceeds with the following Step 409. In Step 409, a settlement and liquidation subprogram 715 (shown in FIG. 7) of the IOFP is executed to receive the deposit amount from the user (i.e., the user becomes a depositor) according to the bid price placed by the user and the contribution amount set by the user. In addition, if the credit amount is smaller than the amount that the user would receive by winning the bid, the credit amount will be increased by adding the deposit amount received by the IOFP to the credit amount, and thereby an updated credit amount will be assigned to the user for next bid.

When the verification of the Step 404 is false, then in Step 406, the member (user) decides whether to set a new bid price, a new number of terms, and/or a new contribution amount. If the member (user) decides to set a new bid price, a new number of terms, and/or a new contribution amount, then the process 40 proceeds with Step 402 for receiving the user's new inputs; otherwise, the process 40 goes to Step 407. In Step 407, the member (user) logs out of the IOFP.

In addition, when the checking result of Step 405 is true (meaning that the credit amount is greater than or equal to the amount that the user would receive by winning the bid, then the process 40 proceeds with Step 408. In Step 408, the IOFP uses a threshold price as an benchmark to decide whether the member is a bid winner, wherein the threshold price is determined by the IOFP referring to funding supply (the amount of funding available), needs of funding, and differences between the long-term interest rate and the short-term interest rate. If the member (user) wins the current bid of the interactive online funding activity, i.e., the member's bid price is greater than or equal to the threshold price and the credit amount is greater than or equal to the amount that the member would receive by winning the bid, the member becomes a borrower. As a result, in Step 411, the IOFP performs settlement and liquidation to remit the loan amount to the user (i.e., a borrower now). On the contrary, when the member (user) fails to win the bid of the interactive online funding activity, then in Step 410, the IOFP asks the member whether he/she would like to place a new bid price, i.e., a higher bid price. If the member decides to place a new bid price, the process 40 proceeds with Step 403. If the member decides to give up placing a higher bid price, however, then the process 40 goes to the following Step 412. In Step 412, as the bid price is lower than the threshold price even though the credit amount is greater than or equal to the amount that the member would receive by winning the bid, the member becomes a lender (i.e., a depositor) who is required to offer the deposit amount to the IOFP. The IOFP performs settlement and liquidation to receive the deposit amount from the user according to the bid price.

It should be noted that as long as the member remains a lender, the member who is not yet a borrower is permitted to participate in the bidding process shown in aforementioned process 40 in a next term (i.e., the next bid), until the member wins the bid of the interactive online funding activity.

Figure 5:
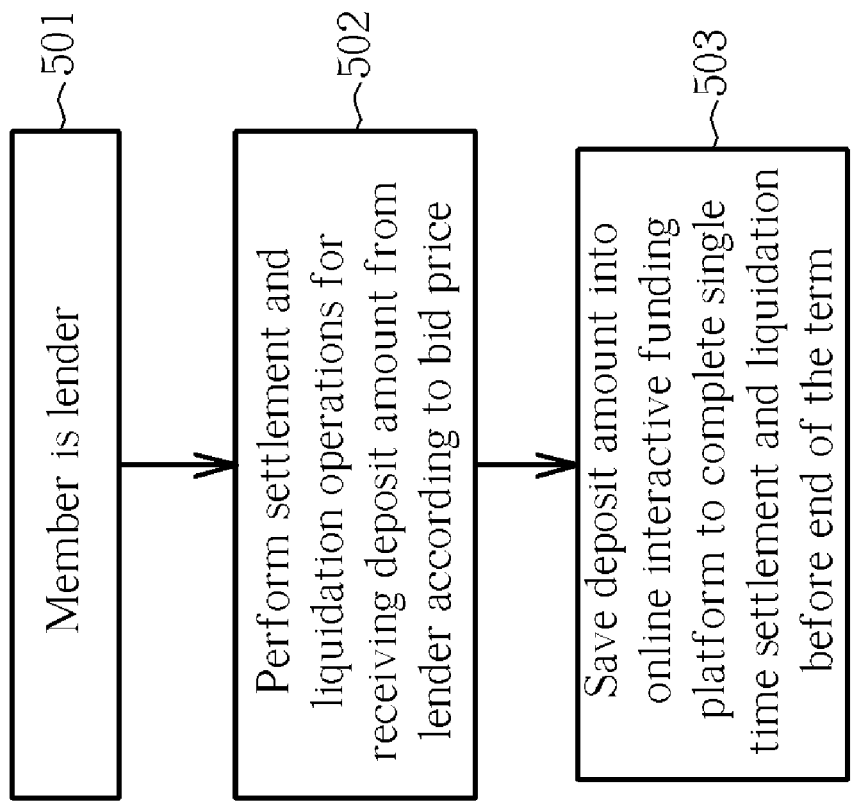
FIG. 5 is a flowchart illustrating settlement and liquidation for receiving a deposit amount from the user according to one exemplary embodiment of the present invention.

Please refer to FIG. 5. FIG. 5 is a flowchart illustrating settlement and liquidation for receiving a deposit amount from the user according to one exemplary embodiment of the present invention. As shown in FIG. 5, in Step 501, the member is the lender. Next, in Step 502, the IOFP performs settlement and liquidation operations to receive the deposit amount from the lender according to the bid price via the IOFP. Proceeding with Step 503, before the end of the current term, the lender needs to save the deposit amount into the IOFP to complete a one-time settlement and liquidation.

Figure 6:
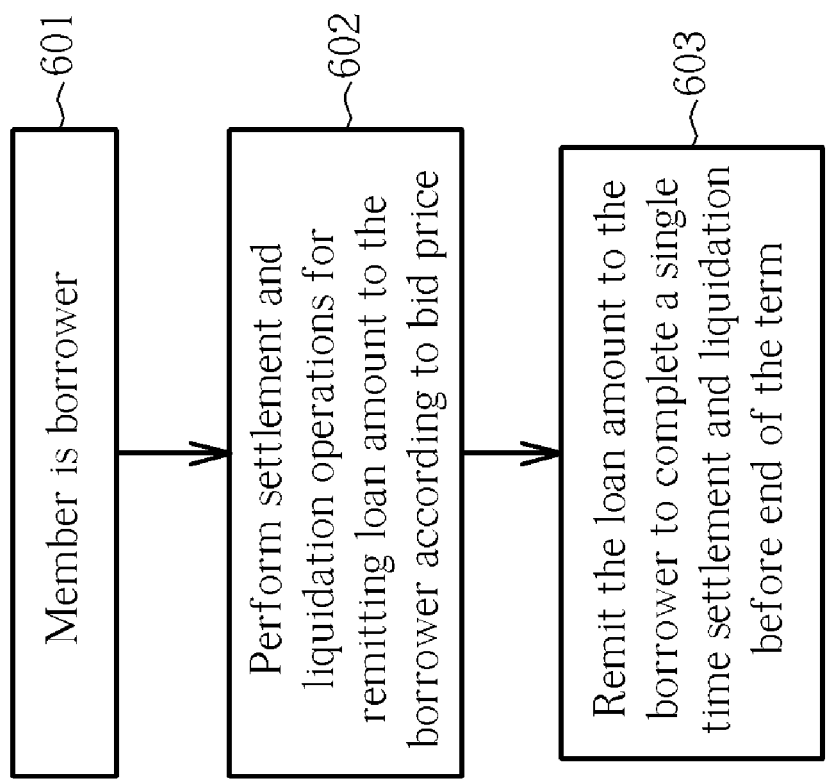
FIG. 6 is a flowchart illustrating settlement and liquidation for remitting a loan amount to the user according to one exemplary embodiment of the present invention.

Please refer to FIG. 6. FIG. 6 is a flowchart illustrating settlement and liquidation for remitting a loan amount to the user according to one exemplary embodiment of the present invention. As shown in FIG. 6, in Step 601, the member is the borrower. Next, in Step 602, the IOFP performs settlement and liquidation to remit the loan amount to the borrower according to the above-mentioned number of terms, user's bid price, and contribution amount. Proceeding with Step 603, before the end of the current term, the IOFP remits the loan amount to the borrower to complete a one-time settlement and liquidation.

Figure 7:
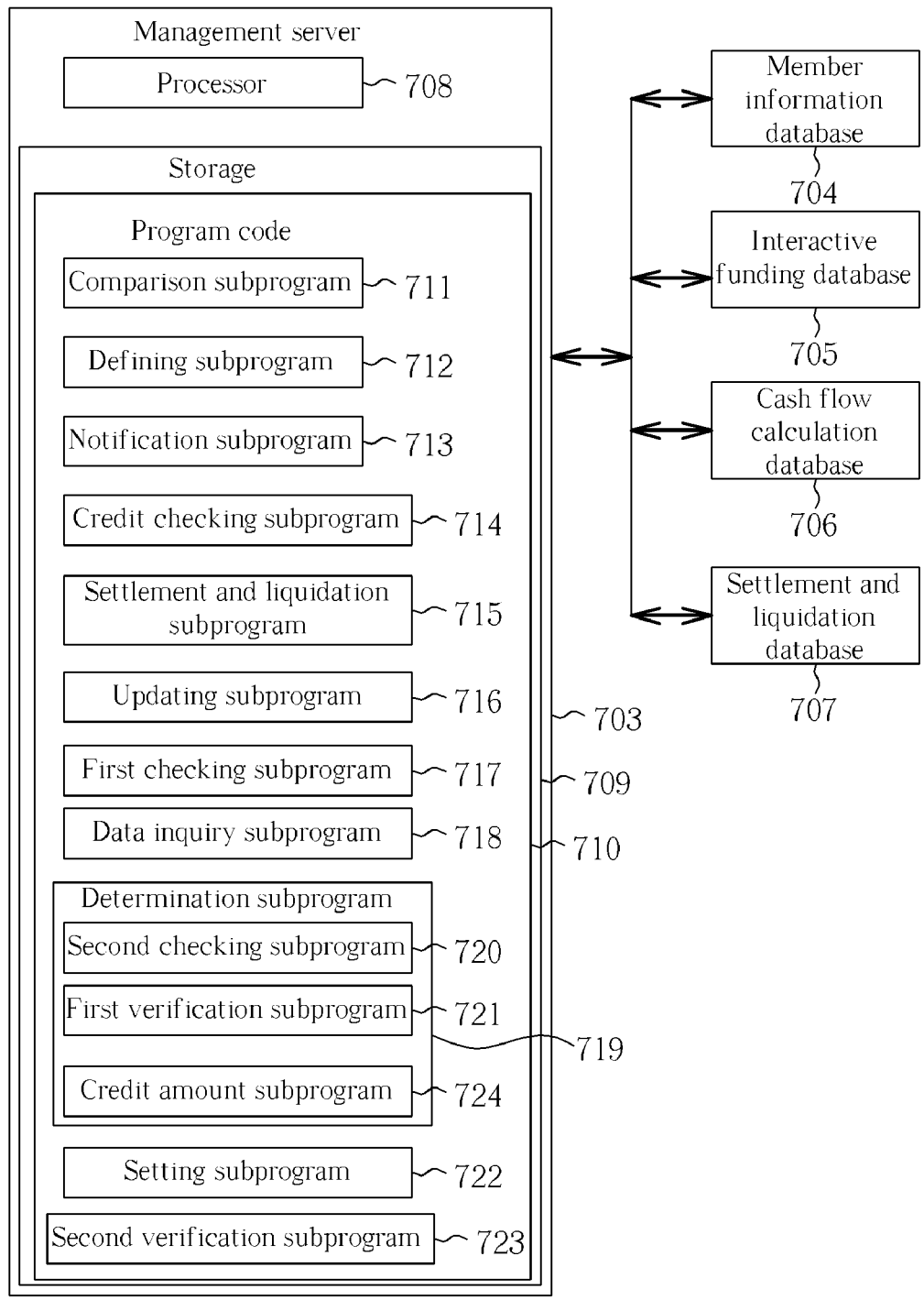
FIG. 7 is a block diagram illustrating an interactive online funding system (IOFS) according to an exemplary embodiment of the present invention.

Please refer to FIG. 7. FIG. 7 is a block diagram illustrating an IOFS 70 according to an embodiment of the present invention. As shown in FIG. 7, the interactive online funding system (IOFS) 70 includes a management server 703, a member information database 704, an interactive funding database 705, a cash flow calculation database 706, and a settlement and liquidation database 707. The management server 703 further includes a processor 708 and a storage 709. The storage 709 is coupled to the processor 708 for storing a first program code 710, wherein when the processor 708 executes the first program code 710, the first program code 710 provides an IOFP for a user to participate in an interactive funding activity by placing a bid price in the IOFP. The first program code 710 further comprises a comparison subprogram 711 for comparing the bid price of the user with a threshold price set by the IOFP. When the bid price is greater than or equal to the threshold price, the IOFP performs a settlement and liquidation subprogram 715 to remit a loan amount to the user according to at least the bid price; when the bid price is lower than the threshold price, the IOFP performs the settlement and liquidation subprogram 715 to receive a deposit amount from the user according to the bid price. In addition, the first program 711 includes a defining subprogram 712 for defining an upper bound and a lower bound of the bid price allowed to be placed by the user, a notification subprogram 713 for notifying the user of the lower bound, a credit checking subprogram 714 for checking a credit amount of the user (wherein the credit amount defines a maximum loan amount granted to the user), a settlement and liquidation subprogram 715, a updating subprogram 716, a first checking subprogram 717, a data inquiry subprogram 718, a determination subprogram 719, a setting subprogram 722, and a second verification subprogram 723. The settlement and liquidation subprogram 715 is for receiving the deposit amount from the user according to the threshold price if the user becomes a depositor because the user's credit amount is smaller than the amount that the user would receive by winning the bid, and for receiving the deposit amount from the user according to the bid price if the user's credit amount is greater than the amount that the user would receive by winning the bid and the user's bid is lower than the threshold price. The settlement and liquidation subprogram 715 is also for remitting the loan amount to the user according to the bid price if the user's credit amount is greater than or equal to the amount that the user would receive by winning the bid and the user's bid price is greater than or equal to the threshold price. The updating subprogram 716 is for when the credit amount is smaller than the amount that the user would receive by winning the bid, updating the credit amount by adding the deposit amount received by the IOFP to the credit amount. The first checking subprogram 717 is for checking whether or not the user decides to participate in the interactive funding activity, generating a first checking result. The data inquiry subprogram 718 is for performing a data inquiry operation if the first checking result indicates that the user decides not to participate in the interactive funding activity. The determination subprogram 719 is for determining the credit amount of the user if the first checking result indicates that the user decides to participate in the interactive funding activity. The setting subprogram 722 is for setting a number of terms and a contribution amount for each term. Finally, the second verification subprogram 723 is for verifying the number of terms, the contribution amount, and the bid price to check validity thereof.

The determination subprogram 719 further includes a second checking subprogram 720, checking whether the user submits an online credit amount application, and generating a second checking result; a first verification subprogram 721, verifying the online credit amount application to generate a verification result if the second checking result indicates that the user submits the online credit amount application; a credit amount subprogram 724 is executed by the processor 708 to determine the credit amount of the user according to the verification result. If the second checking result indicates that the user submits the online credit amount application, the interactive funding activity proceeds after the credit amount is determined; if the second checking result indicates that the user does not submit the online credit amount application, the interactive funding activity proceeds directly. Since a skilled person can readily appreciate the operations of the aforementioned subprograms after reading the above disclosure, further description is omitted here for the sake of brevity.

The IOFS 70 further includes a member information database 704 coupled to the management server 703 for storing the member information generated through exchanging messages between the member 701 and the management server 703. In addition, the IOFP 702 manages the login of the member 701 according to the member information database 704. An interactive funding database 705 is coupled to the management server 703 for storing data of the interactive funding activity, including (without limitation) the interactive funding activity of the member 701 and verification information for the management server 703. A cash flow calculation database 706 is coupled to the management server 703 for storing a cash flow of loan and deposit settled by the management server 703 and the interest rate of the bid price. A settlement and liquidation database 707 is coupled to the management server 703 for storing data of settlement and liquidation executed by the management server 703.

It should be noted that the management server 703 utilizes a communication network, a wired communication device, a wireless communication device, or other devices with communication capabilities to exchange information safely with the member 701 in real-time, and further connects to the aforementioned databases 704, 705, 706, and 707 for storing data, the messages, and results into its own database, respectively.

Certain examples are given as follows to more clearly illustrate the technical features of the present invention. Regarding the first example, after a member A applies and is verified to participate in the IOFP, the management server of the IOFP may offer member A a member ID and a member password. Next, after member A logs into the IOFP with the member ID and the member password, member A participates in the interactive online funding activity and performs data inquiry. After the member A logs into the IOFP, the member A may select data inquiry or to participate in the interactive online funding activity. After the member A decides to participate in the interactive online funding activity, the management server checks if the member A has applied for a credit amount. If the member A has not applied for a credit amount, the management server of the IOFP offers the member A a credit amount of zero. Accordingly, the member A is only a depositor because the member A does not have a credit amount greater than or equal to the amount the member A would receive by winning the bid, i.e., the member A is not qualified to bid. The credit amount will be increased thereafter by accumulating the amount deposited by the member A into the IOFP in each term and by accumulating the interest earned by the user. After the credit amount of the member A is greater than or equal to the amount that the member A would receive by winning the bid in the IOFP, the member A may start to bid in the IOFP.

On the other hand, if the member A applies for a credit amount, the IOFP verifies the application of the member A. If the verification is successful, the IOFP offers a credit amount for the member A. The credit amount is granted to the member A as the maximum loan amount available to the member A in the interactive online funding activity, and the owner of the IOFP is responsible for the risk of bad debt.

If the application of the member A is unsuccessful or the verification is also unsuccessful, the credit amount granted to the member A is zero, and the credit amount of the member A will be increased by accumulating the deposit amount received by the IOFP from the member A in each term. If the member A decides to participate in the interactive online funding activity, the IOFP requires the member A to input a bid price, a number of terms, and a contribution amount for each term. The IOFP verifies the aforementioned inputted content to decide whether to accept the above-mentioned content inputted by the member A. If the IOFP does not accept the above-mentioned inputted content, the member A may decide whether to continue placing the bid price. If the member A does not continue to place the bid price, the member A ends the interactive online funding activity of this term and logs out of the IOFP. The IOFP verifies all bid prices inputted by the member A to check whether or not a bid price would cause a loan amount to exceed the credit amount of the member A in one term. If the bid price results in a loan amount over the credit amount for the member A, the bid price of the member A is deemed invalid, and then the member A is a depositor.

On the other hand, when the aforementioned bid price does not result in a loan amount over the aforementioned credit amount for the member A, the bid price is valid. When the member A wins the bid in the interactive online funding activity, the member A is a borrower and receives the loan amount according to settlement and liquidation of the IOFP.

For the second example, if a member B utilizes a member ID and a member password to log into an IOFP, the IOFP verifies the member ID and the member password of the member B. After the verification is successful, the member B may select data inquiry or participate in the interactive online funding activity. When the member B participates in the interactive online funding activity, the member B determines a bid price, a number of terms, and a contribution amount for each term according to the member B's needs, then the IOFP verifies the above-mentioned bid price, the number of terms and the contribution amount for each term for checking whether to accept the determination of the member B. The IOFP decides a threshold price in the interactive online funding activity, wherein the threshold price is dynamically adjusted and is generated according to funding supply, funding demand, and difference between long-term and short-term interest rate. Next, the IOFP compares the bid price of the member B with the threshold price. If the bid price is lower than the threshold price, the IOFP does not accept the bid price of the member B. On the other hand, if the bid price of the member B is greater than or equal to the threshold price, the IOFP accepts the bid price of the member B. If the IOFP accepts the bid price of the member B, the IOFP verifies whether or not the loan amount derived from the bid price is greater than the credit amount of the member B for a term in which the member B decides to bid. When the loan amount derived from the bid price placed by the member B is not greater than the credit amount of the member B in the term, the member B completes the interactive online funding activity of the term, and wins the loan amount.

The obtained funding in the term can be represented as follows:

$$An = (U-1n) \times ((N-n) + (U \times (n \times 1))$$

Equation (1)

or $$An = (U \times (N-n)) + (U \times (n-1)) + \sum_{i=1}^{n-1} Ii$$

Equation (2)

In above equations, 'An' represents a total amount of the $n^{th}$ term obtained by the winner in the interactive online funding activity, 'U' represents the contribution amount, 'N' represents the number of terms, 'i' is the number of the selected term, and 'In' represents the amount of the bid from the bid winner in the $n^{th}$ term, i.e., the In is the valid bid price and also represents the interest of each term offered by the member.

Assume that the member B participates in an interactive online funding activity, sets the number of terms as 24 and the contribution amount for each term as $10,000, and bids $1,000. The followings are three scenarios displaying how the IOFP utilizes the Equation (1) for settlement and liquidation in the interactive online funding activity.

Scenario 1: If the member B bids $1,000 in the $6^{th}$ term, and the bid is verified and accepted by the IOFP, the loan amount obtained by the member B from the IOFP in the $6^{th}$ term according to the Equation (1) is as below:

($10000−$1000)*(24−6)+$10000*(6−1)=$212,000

It should be noted that as the member B wins the bid in the $6^{th}$ term, the member B does not pay (deposit) money to the IOFP for the $6^{th}$ term. In addition, regarding the remaining $7^{th}$-$24^{th}$ terms, the member B should return (deposit) $10,000 to the IOFP for each remaining term.

Scenario 2: If the member B bids $1,000 in the $6^{th}$ term, and the bid is verified and not accepted by the IOFP, the amount deposited by the member B to the IOFP in the $6^{th}$ term is as below:

$10000−$1000=$9,000

Scenario 3: If the member B bids $1,000 in the $6^{th}$ term, and the bid price is verified and not accepted by the IOFP, the member B continues to place a new bid price equal to $1,200. If the IOFP accepts the bid price of $1,200, the loan amount obtained by the member B from the IOFP in the $6^{th}$ term according to the Equation (1) is as below:

($10000−$1200)*(24−6)+$10000*(6−1)=$208,400

Similarly, as the member B wins the bid in the $6^{th}$ term, the member B does not pay (deposit) money to the IOFP for the $6^{th}$ term. In addition, regarding the remaining ($7^{th}$-$24^{th}$) terms, the member B should return (deposit) $10,000 to the IOFP for each remaining term.

For the third example, the IOFP also determines a lower bound of the bid price allowed to be placed by the member, wherein the lower bound is referred to as a guaranteed deposit interest for those who merely use the IOFP to save money. If the member does not participate in the bidding process, the member deposits an amount, a resultant value of subtracting the lower bound of the bid price from the contribution amount (i.e., $10,000), to the IOFP. For instance, a member D does not participate in the bidding process for all terms where the number of terms is 24, the lower bound of bid price is $800, and the contribution amount for each term is $10,000. As the lower bound of bid price ($800) must be lower than the threshold price and cannot win the bid, the member D should pay (deposit) $9,200, i.e., $10,000−$800, to the IOFP. In each of the $1^{st}$-$23^{rd}$ terms, the member D deposits $9,200 to the IOFP. In other words, the member D deposits $9200*23 to the IOFP in total. In the $24^{th}$ term (i.e., the last term), the member D is directly regarded as a winner of the current bid, and pays (deposits) money to the IOFP no more. The loan amount obtained by the member D from the IOFP in the $24^{th}$ term according to the Equation (1) is as below:

0+$10000*(24−1)=$230,000

Please note that above examples are for illustrative purposes only, and form no limitation to the scope of the present invention.

In conclusion, the present invention changes the prior art funding approach between the prior art financial institutions. The present invention has following novelty, non-obviousness, and utility:

One of the objectives of the claimed invention is to solve the problems caused by prior art indirect financing, and to respond to the needs for financial electronic commerce.

It is one of the objectives of the claimed invention to connect the users directly with the financial institutions via the Internet and the system platform to change the indirect financing by which prior art financial institutions earn their spread (i.e., the difference between the loan interest received and the deposit interest paid out).

It is one of the objectives of the claimed invention to utilize the features of the Internet for direct connections between the users and financial institutions to reduce transaction costs.

It is one of the objectives of the claimed invention to provide customized financial products to allow the users to deposit or obtain funding via the IOFP, according to their financial situations and financial planning needs, wherein an interest rate is floating according to needs of the users and the funding supply of the financial institutions.

It is one of the objectives of the claimed invention to provide the users with a novel financial concept that the users may themselves benefit through interest arbitrage via the IOFP or via an interactive funding platform managed by other financial institutions.

Those skilled in the art will readily observe that numerous modifications and alterations of the device and method may be made while retaining the teachings of the invention.

What is claimed is:

1. An interactive online funding method, comprising:
(A) a management server receiving a bid price placed by a user;
(B) the management server determining a threshold price according to at least one of a funding supply, needs of funding, and a difference between a long-term interest rate and a short-term interest rate;
(C) the management server determining whether to allow the bid price according to the threshold price and a credit amount of the user;
(D) the management server determining the user to be a lender when the bid price is not larger than the threshold price and when the credit amount is successfully verified;
(E) the management server determining a deposit amount of the user according to the bid price; and
determining a total amount obtained by a winner winning a bid at the current term according to the contribution amount, a value of the number of total terms, a bid price given by the winner at the current term,
wherein determining the total amount obtained by the winner at the current term comprises:
determining the total amount at an n-th term according to $An=(U-In)\times((N-n)+(U\times(n-1)));$ wherein An represents the total amount obtained by the winner at the n-th term of bidding, U represents the contribution amount, N represents the value of the number of terms, and In represents the bid price given by the winner at the n-th term.

2. The interactive online funding method of claim 1, further comprising:
(F) the management server determining the user to be a borrower when the bid price is larger than the threshold price and when the credit amount is successively verified; and
(G) the management server determining a loan amount remitted for the user according to a number of terms, the bid price, and a contribution amount for each term.

3. The interactive online funding method of claim 1 wherein the step (C) comprises:
   (C1) the management server allowing the bid price when the credit amount is successively verified and when the bid price is larger than the threshold price.
4. The interactive online funding method of claim 1 where the step (c) comprises:
   (C2) the management server declining the bid price when the credit amount is not successively verified or when the bid price is smaller than the threshold price.
5. The interactive online funding method of claim 1 further comprising:
   the management server receiving at least one of a value of the number of terms and the contribution amount for each term from the user.
6. The interactive online funding method of claim 1 further comprising:
   defining an upper bound and a lower bound of the bid price; and
   setting a value of the number of terms and the contribution amount of each term.
7. An interactive online funding system, comprising:
   a management server for receiving a bid price placed by a user, configured to determine a threshold price according to at least one of a funding supply, needs of funding, and differences between a long-term interest rate and a short-term interest rate; configured to determine whether to allow the bid price according to the threshold price and a credit amount of the user; and configured to determine the user to be a lender when the bid price is not larger than the threshold price and when the credit amount is successively verified, and the management server determining a deposit amount of the user according to the bid price;
   a member information database coupled to the management server for storing member information generated through exchanging messages between a user and the management server;
   an interactive funding database coupled to the management server for storing data of interactive funding activities and verification information between the user and the management server;
   a cash flow calculation database is coupled to the management server for storing a cash flow of the loan amount and the deposit amount settled by the management server according to an interest rate of the bid price; and
   a settlement and liquidation database is coupled to the management server for storing data of settlement and liquidation executed by the management server,
   wherein the management server is configured to determine a total amount obtained by a winner winning a bid at the current term according to the contribution amount, a value of the number of total terms, and a bid price given by the winner at the current term,
   wherein the total amount at an n-th term is determined by the management server according to $An = (U-1n) \times ((N-n) + (U \times (n-1))$; and wherein An represents the total amount obtained by the winner at the n-th term of bidding, U represents the contribution amount, N represents the value of the number of terms, and In represents the bid price given by the winner at the n-th term.
8. The interactive online funding system of claim 7, wherein the management server is further configured to determine the user to be a borrower when the bid price is larger than the threshold price and when the credit amount is successively verified, and is configured to determine a loan amount remitted for the user according to a number of terms, the bid price, and a contribution amount for each term.
9. The interactive online funding system of claim 7 wherein the management server is configured to allow the bid price when the outcome of verifying the credit amount is true and when the bid price is larger than the threshold price.
10. The interactive online funding system of claim 7 wherein the management server is configured to decline the bid price when the credit amount is not successively verified or when the bid price is smaller than the threshold price.
11. The interactive online funding system of claim 7 wherein the management server is configured to receive at least one of a value of the number of terms and the contribution amount for each term from the user.
12. The interactive online funding system of claim 7 wherein the management server is configured to define an upper bound and a lower bound of the bid price and is configured to set a value of the number of terms and the contribution amount of each term.
13. An interactive online funding method, comprising:
   (A) a management server receiving a bid price placed by a user;
   (B) the management server determining a threshold price according to at least one of a funding supply, needs of funding, and a difference between a long-term interest rate and a short-term interest rate;
   (C) the management server determining whether to allow the bid price according to the threshold price and a credit amount of the user;
   (D) the management server determining the user to be a lender when the bid price is not larger than the threshold price and when the credit amount is successfully verified;
   (E) the management server determining a deposit amount of the user according to the bid price; and
   determining a total amount obtained by a winner winning a bid at the current term according to the contribution amount, a value of the number of total terms, a sum of bid prices given by winners of previous terms,
   wherein determining the total amount obtained by the winner at the current term comprises:
   determining the total amount at an n-th term according to $$An = (U \times (N-n)) + (U \times (n-1)) + \sum_{i=1}^{n-1} li$$

wherein An represents the total amount obtained by the winner at the n-th term of bidding, U represents the contribution amount, N represents the value of the number of terms, li indicates a bid price given by a winner at an i-th term prior to the n-th term, and $$\sum_{i=1}^{n-1} li$$

represents the sum of bid prices given by the winners at the previous terms.
14. The interactive online funding method of claim 13, further comprising:

(F) the management server determining the user to be a borrower when the bid price is larger than the threshold price and when the credit amount is successively verified; and (G) the management server determining a loan amount remitted for the user according to a number of terms, the bid price, and a contribution amount for each term.

15. The interactive online funding method of claim 13 wherein the step (C) comprises:

(C1) the management server allowing the bid price when the credit amount is successively verified and when the bid price is larger than the threshold price.

16. The interactive online funding method of claim 13 where the step (c) comprises:

(C2) the management server declining the bid price when the credit amount is not successively verified or when the bid price is smaller than the threshold price.

17. The interactive online funding method of claim 13 further comprising:

the management server receiving at least one of a value of the number of terms and the contribution amount for each term from the user.

18. The interactive online funding method of claim 13 further comprising:

defining an upper bound and a lower bound of the bid price; and setting a value of the number of terms and the contribution amount of each term.

19. An interactive online funding system, comprising:

a management server for receiving a bid price placed by a user, configured to determine a threshold price according to at least one of a funding supply, needs of funding, and differences between a long-term interest rate and a short-term interest rate; configured to determine whether to allow the bid price according to the threshold price and a credit amount of the user; and configured to determine the user to be a lender when the bid price is not larger than the threshold price and when the credit amount is successively verified, and the management server determining a deposit amount of the user according to the bid price;

a member information database coupled to the management server for storing member information generated through exchanging messages between a user and the management server;

an interactive funding database coupled to the management server for storing data of interactive funding activities and verification information between the user and the management server;

a cash flow calculation database is coupled to the management server for storing a cash flow of the loan amount and the deposit amount settled by the management server according to an interest rate of the bid price; and a settlement and liquidation database is coupled to the management server for storing data of settlement and liquidation executed by the management server, wherein the management server is configured to determine a total amount obtained by a winner winning a bid at the current term according to the contribution amount, a value of the number of total terms, a sum of bid prices given by winners at previous terms, wherein the total amount at an n-th term is determined by the management server according to $$An = (U \times (N - n)) + (U \times (n - 1)) + \sum_{i=1}^{n-1} li; \text{ and}$$

wherein An represents the total amount obtained by the winner at the n-th term of bidding, U represents the contribution amount, N represents the value of the number of terms, li indicates a bid price given by a winner at an i-th term prior to the n-th term, and $$\sum_{i=1}^{n-1} li$$

represents the sum of bid prices given by the winners at the previous terms of the n-th term.

20. The interactive online funding system of claim 19, wherein the management server is further configured to determine the user to be a borrower when the bid price is larger than the threshold price and when the credit amount is successively verified, and is configured to determine a loan amount remitted for the user according to a number of terms, the bid price, and a contribution amount for each term.

21. The interactive online funding system of claim 19 wherein the management server is configured to allow the bid price when the outcome of verifying the credit amount is true and when the bid price is larger than the threshold price.

22. The interactive online funding system of claim 19 wherein the management server is configured to decline the bid price when the credit amount is not successively verified or when the bid price is smaller than the threshold price.

23. The interactive online funding system of claim 19 wherein the management server is configured to receive at least one of a value of the number of terms and the contribution amount for each term from the user.

24. The interactive online funding system of claim 19 wherein the management server is configured to define an upper bound and a lower bound of the bid price and is configured to set a value of the number of terms and the contribution amount of each term.

* * * * *